United States Patent
Fukumori et al.

(10) Patent No.: US 8,399,037 B2
(45) Date of Patent: Mar. 19, 2013

(54) GRAIN OR LEGUME HAVING INCREASED CONTENT OF FUNCTIONAL COMPONENT AND A MANUFACTURING METHOD THEREOF

(75) Inventors: Takeshi Fukumori, Tokyo (JP); Shigeharu Kanemoto, Tokyo (JP); Hidenori Mizuno, Tokyo (JP); Keishi Wakabayashi, Tokyo (JP); Hou Qing Liu, Tokyo (JP); Shinya Ochiai, Tokyo (JP)

(73) Assignee: Satake Corporation, Tokyo (JP)

( * ) Notice: Subject to any disclaimer, the term of this patent is extended or adjusted under 35 U.S.C. 154(b) by 672 days.

(21) Appl. No.: 12/153,375

(22) Filed: May 16, 2008

(65) Prior Publication Data

US 2008/0286435 A1   Nov. 20, 2008

(30) Foreign Application Priority Data

May 17, 2007   (JP) .................................. 2007-131438
Aug. 31, 2007  (JP) .................................. 2007-226982
Mar. 10, 2008  (JP) .................................. 2008-059288

(51) Int. Cl.
    *A23L 1/20* (2006.01)
(52) U.S. Cl. ......... 426/506; 426/507; 426/510; 426/511
(58) Field of Classification Search ................. 426/507, 426/511, 640, 456, 318–319, 560, 623, 626, 426/506, 510, 520; *A23L 1/20*
See application file for complete search history.

(56) References Cited

U.S. PATENT DOCUMENTS

| | | | | |
|---|---|---|---|---|
| 3,157,514 A | * | 11/1964 | Gorozpe | 426/461 |
| 3,228,774 A | | 1/1966 | Sanders et al. | |
| 3,429,709 A | | 2/1969 | Masri et al. | |
| 3,911,147 A | * | 10/1975 | Barham et al. | 426/318 |
| 4,450,181 A | * | 5/1984 | Satake | 426/507 |
| 4,758,441 A | | 7/1988 | Negishi et al. | |
| 5,472,730 A | | 12/1995 | Saikusa et al. | |
| 6,086,935 A | | 7/2000 | Delrue et al. | |
| 6,410,070 B2 | | 6/2002 | Dahlén et al. | |

(Continued)

FOREIGN PATENT DOCUMENTS

| | | |
|---|---|---|
| JP | 7-2313252 | 8/1995 |
| JP | 11-151072 | 6/1999 |

(Continued)

OTHER PUBLICATIONS http://www.indpipe.com/images/PDF/steam_temperature_pressure_table.pdf, 1 page, date N/A.*

(Continued)

*Primary Examiner* — Steven Leff
(74) *Attorney, Agent, or Firm* — Staas & Halsey LLP

(57) ABSTRACT

Grain or legume having an increased content of a functional component (γ-aminobutyric acid) is obtained by humidifying grain (such as rice, wheat or corn) or legume (such as soybean and adzuki bean) by forcing the grain into an air having a temperature of 50° C. or more and a relative humidity of 90% or more such that a moisture content thereof rises within the range of 16.0% to 18.5%, and thereafter, drying the grain or legume.

1 Claim, 9 Drawing Sheets

U.S. PATENT DOCUMENTS

| | | | |
|---|---|---|---|
| 2002/0031596 A1* | 3/2002 | Aoto et al. | 426/618 |
| 2006/0153965 A1 | 7/2006 | Borders et al. | |
| 2006/0263499 A1* | 11/2006 | Satake et al. | 426/506 |
| 2007/0141216 A1 | 6/2007 | Kihara et al. | |
| 2007/0196559 A1* | 8/2007 | Fukumori et al. | 426/618 |

FOREIGN PATENT DOCUMENTS

| | | |
|---|---|---|
| JP | 2000-300196 | 10/2000 |
| JP | 2003-284488 | 10/2003 |
| JP | 2004-205 | 1/2004 |
| JP | 2004-159617 | 6/2004 |
| JP | 2004-242593 | 9/2004 |
| JP | 2005-13242 | 1/2005 |
| JP | 2005-052073 | 3/2005 |
| JP | 2005-52073 | 3/2005 |
| JP | 2005-168444 | 6/2005 |
| JP | 2006-069942 | 3/2006 |
| JP | 2007-111044 | 5/2007 |
| JP | 2007-129993 | 5/2007 |
| JP | 2008-237179 | 10/2008 |
| JP | 2008-307045 | 12/2008 |
| JP | 2009-201396 | 9/2009 |
| JP | 2009-207488 | 9/2009 |
| WO | WO 2005/055742 A1 | 6/2005 |

OTHER PUBLICATIONS

U.S. Office Action mailed Dec. 14, 2011 in related U.S. Appl. No. 12/929,945.

U.S. Appl. No. 12/929,945, filed Feb. 25, 2011, Takeshi Fukumori, Satake Corporation.

Japanese Office Action for corresponding Japanese Application 2007-226982; drafting date Mar. 8, 2011.

Chinese Office Action for corresponding Chinese Application 200810096549; issued Feb. 2, 2012.

Kazuhiko Itoh et al. "Studies on Brown Rice Conditioning (Part 2)"; Experiment of Deep Layer Conditioning; pp. 443-451, 1986.

Japanese Decision to Grant a Patent mailed Jul. 10, 2012 in Japanese patent Application 2008-059288.

U.S. Office Action for related U.S. Appl. No. 12/929,945; mailed May 30, 2012.

Japanese Office Action for corresponding Japanese Application 2008-059288; dated Mar. 21, 2012.

\* cited by examiner

GRAIN OR LEGUME HAVING INCREASED CONTENT OF FUNCTIONAL COMPONENT AND A MANUFACTURING METHOD THEREOF

This application claims the benefit under 35 U.S.C. Section 119, of Japanese Application 131438/2007, filed May 17, 2007 in Japan, Japanese Application 226982/2007, filed Aug. 31, 2007 in Japan and Japanese Application 059288/2008, filed on Mar. 10, 2008 in Japan, the contents of which are incorporated herein by reference.

BACKGROUND OF THE INVENTION

1. Field of the Invention

The present invention relates to a method of increasing the content of a functional component in grain such as rice or wheat or legume such as soybean or adzuki bean, and grain or legume manufactured by the method.

2. Description of the Related Art

Recently, γ-aminobutyric acid (GABA) has attracted attention as an effective substance for maintaining health or preventing disease by suppressing an increase of blood pressure in human body. Therefore, attempts have been made to increase the content of γ-aminobutyric acid in grain such as brown rice and legume such as soybean.

For example, Japanese Patent Application Laid-Open No. 2005-52073 discloses a method of increasing the content of the γ-aminobutyric acid in brown rice by adding water to brown rice to increase the moisture content of brown rice to 20% or more, loading the brown rice increased in moisture content to a tank separately disposed, and tempering the brown rice while supplying air into the tank.

However, this method has a problem. It is necessary to add water again to brown rice, which has been once dried to a moisture content of 10% to 15%, up to a moisture content exceeding 20%. Therefore, grain must be soaked in water or water must be directly sprayed to grain. Likewise, a humidification means is required. In the processing method for brown rice by rehydration, taste of brown rice is likely to deteriorate. In addition, damage such as rice cracking may occur. Since brown rice once dried is rehydrated and thereafter dehydrated again, the manufacturing cost increases compared to general brown rice.

To prevent taste deterioration and reduce the cost required for hydration and re-dehydration of grains, it has been strongly desired to suppress the addition amount of water to grains as much as possible.

On the other hand, it is known that when the brown rice is sprouted, the content of γ-aminobutyric acid thereof significantly increases. However, it is said that the taste of brown rice with germs, which is obtained by sprouting brown rice is inferior to that of general white rice, as is described, for example, in Japanese Patent Application Laid-Open No. 2005-168444. In the circumstances, it has been desired that the amount of γ-aminobutyric acid contained in brown rice is increased more than that of general brown rice without sprouting brown rice or in such a short time that the germ portion of the brown rice is not swollen.

Another method is disclosed, for example, in Japanese Patent Application Laid-Open No. 11-151072, in which the amount of GABA contained in soybeans is increased by spraying water to the soybeans to add water thereto and stirring them in the ambient conditions of 60° C. or less.

However, this method has a problem. The pH value of spray water must be adjusted by acetic acid. In addition, the amount of spray water must be controlled so as to be a ratio of 20 to 30% by weight relative to the amount of target soybeans whose GABA content is to be increased. Besides this, soybeans must be stirred such that the sprayed water is uniformly absorbed by the soybeans.

In the circumstances, it has been desired to easily carry out a process for adding water to legume to increase the amount of GABA thereof.

SUMMARY OF THE INVENTION

The present invention was attained in view of the aforementioned problems. An object of the present invention is to provide a technique for greatly increasing the amount of a functional component such as γ-aminobutyric acid contained in grain compared to commercially available grain by adding a minimal amount of water to the grain. Another object of the present invention is to provide a method of adding water to legume to increase the amount of γ-aminobutyric acid contained in the legume without controlling the addition amount of water or stirring the legume during addition of water.

To attain the aforementioned objects, a method of manufacturing grain or legume having an increased content of a functional component according to the present invention includes a humidification step of humidifying a raw material such as grain or legume and a dehydration step (which is performed after the humidification step) of drying the raw material. In the humidification step, the raw material is humidified by exposing it to highly humidified air such that the moisture content of the raw material rises within the range of 16.0% to 18.5%.

A method of manufacturing grain including rice, wheat, buckwheat, foxtail millet, millet and corn having an increased content of a functional component according to the present invention includes a humidification step of humidifying raw material grains and a dehydration step of drying the grains after the humidification step. In the humidification step, the grains are humidified by forcing them into an air having a temperature of 50° C. or more and a relative humidity of 90% or more such that the moisture content of the grains rises within the range of 16.0% to 18.5%.

In the humidification step, in order to control the moisture content of grains so as to rise within the range of 16.0% to 18.5% by forcing the grains into an air having a temperature of 50° C. or more and a relative humidity of 90% or more, the grains may be humidified at a humidification rate of 0.3%/hour or less.

In the humidification step, in order to control the moisture content of grains so as to rise within the range of 16.0% to 18.5% by forcing the grains into an air having a temperature of 50° C. or more and a relative humidity of 90% or more, the grains may be humidified in such a manner that the temperature of the air is gradually increased after initiation of humidification and finally reaches 50° C. or more.

Furthermore, a stationary step may be provided during the humidification step or before the dehydration step for allowing the grains humidified to stand still for a predetermined time without forcing the grains into an air.

When brown rice is obtained by applying a method of manufacturing grain having an increased content of a functional component according to the present invention, the brown rice may be further milled to obtain partially milled rice, rice with germ or white rice (milled rice) having an increased content of the functional component. Furthermore, if necessary, these grains may be processed into clean washed partially milled rice, clean washed rice with germ or clean washed rice.

According to the method of manufacturing legume (including soybean, adzuki bean, mung bean, mottled kidney bean) having an increased content of a functional component according to the present invention, the air into which the raw material (legume) is forced in the humidifying step may have a temperature of 50° C. to 70° C. and a relative humidity of 90% or more.

According to the method of manufacturing grain having an increased content of a functional component of the present invention, the moisture content of raw material grain needs not to be increased to more than 18.5%. Therefore, it is not necessary to use a means for adding water such as soaking grain in water or spray water to grain but it is sufficient to use a humidification means such as application of humidifying air in order to increase the moisture content of grain. In addition, since grain may be humidified at a very slow rate, it is possible to prevent damages of grains such as rice cracking. Furthermore, not only the cost required for increasing the moisture content of grain but also the cost required for drying the grain increased in moisture content can be reduced. Besides this, since the moisture content needs not to be increased to more than 18.5%, grains never germinate. Thus, an appearance change such as a sign of germination never occurs. As a result, the deterioration of taste, which is caused by germination, can be prevented. When brown rice is chosen from the aforementioned grains and milled to white rice, the taste of boiled rice thereof is equivalent to that of general boiled rice.

Furthermore, in the method of manufacturing legume having an increased content of a functional component according to the present invention, raw material legume is humidified by applying highly humidified air to the legume. According to this method, the moisture content of legume never exceeds 18.5%, unlike the case where water is directly added to the legume. Therefore, it is not necessary to control the amount of water to be added, unlike the manufacturing method described in Japanese Patent Application Laid-Open No. 11-151072.

Since the moisture content of a raw material needs not to be 20% or more, it is possible to prevent the husk thereof from getting wrinkles. Furthermore, since a raw material is humidified at standstill, unnecessary force (due to stirring or the like) is not applied to the highly humidified raw material, with the result that damages such as rice cracking can be prevented. In addition, it is possible to prevent the taste deterioration caused by high moisture content of a raw material during processing.

BRIEF DESCRIPTION OF THE DRAWINGS

The aforementioned objects, other objects and features of the present invention will be apparent from the following description of examples taken in conjunction with the drawings, in which.

DETAILED DESCRIPTION OF THE PREFERRED EMBODIMENTS

First, a method for manufacturing grain having an increased content of a functional component according to the present invention will be described with reference to FIGS. 1 to 8.

A humidification/dehydration apparatus 1, which has the same structure as a general circulation-type grain dryer, composed of a storage part 2 for storing grains, a humidification/dehydration section 7 for applying humidifying air or hot air to the grains, and a discharge section 10 for discharging the grains in the humidification/dehydration section 7 out of the apparatus, which are sequentially stacked in this order from the top.

Figure 4:
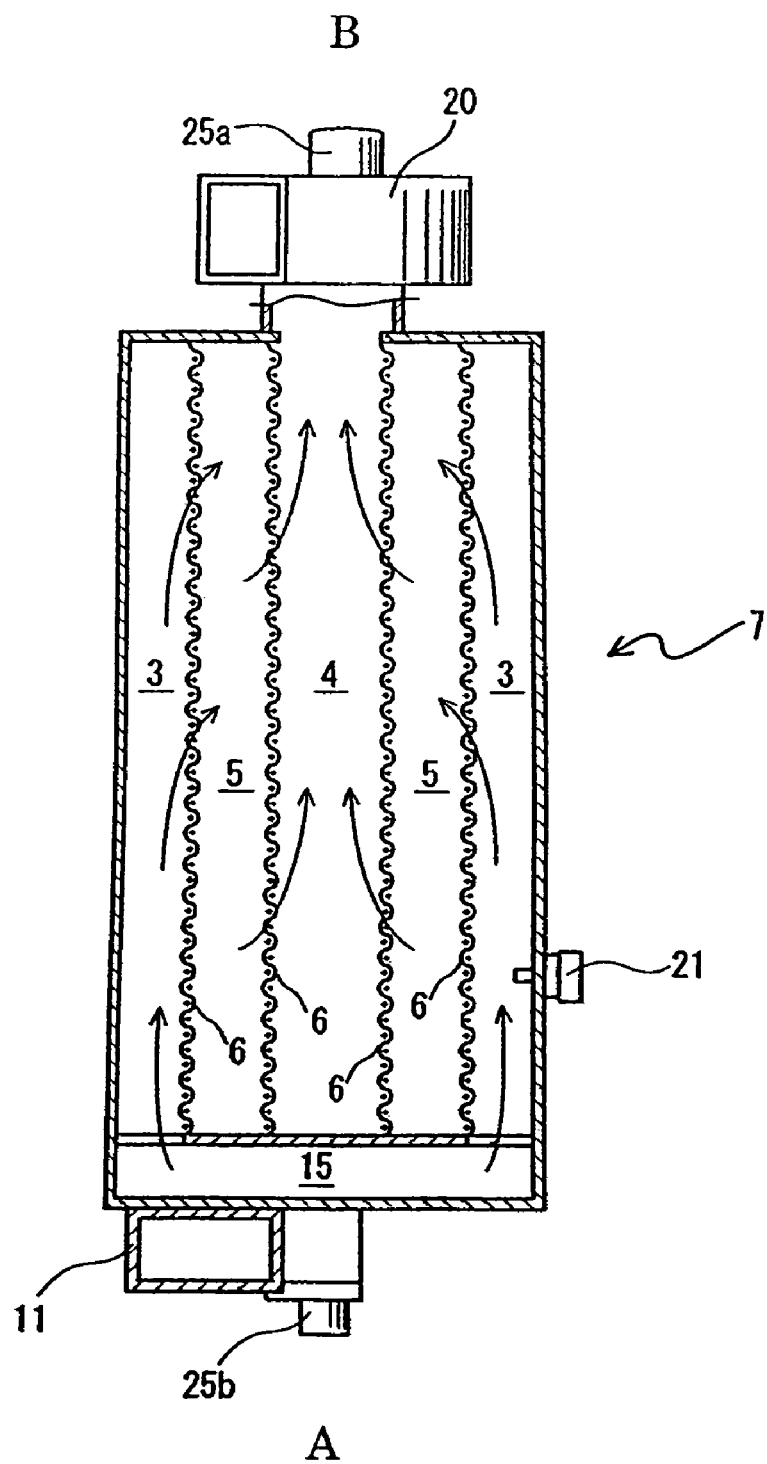
FIG. 4 is a schematic cross-sectional view of a humidification/dehydration section of the humidification/dehydration apparatus of FIG. 2 and illustrates flow of humidifying air and hot air.

In the humidification/dehydration section 7, a plurality of porous plates 6 are arranged longitudinally from one end-side to the other end-side to form an air supply passage 3, an air exhausting passage 4, and a grain flow-down tank 5, as shown in FIG. 4. The grain flow-down tank 5 is connected to the storage part 2. The diameters of a plurality of holes formed in the porous plate 6 must be smaller than those of the grains to be processed.

In the discharge section 10, a discharge valve 8 is provided for discharging grains intermittently below the lower end side of a non-porous plate 12, which is obliquely provided in contact with the grain flow-down tank 5. Below the discharge valve 8, a lower screw conveyer 9 is provided for horizontally conveying the grains discharged from the discharge valve 8 and discharging them out of the apparatus. The grains discharged by the screw conveyer 9 are fed back to the storage part 2 by means of a bucket conveyer 11 and an upper screw conveyer 27 for circulation.

Note that, above the bucket conveyer 11, a bucket conveyer motor 25c is provided. The driving force of the bucket conveyer motor 25c is designed so as to be transmitted not only to the bucket conveyer 11 but also to the upper screw conveyer 27 to drive them. In the discharge section 10, a load-out motor 25b is provided. The discharge valve 8 and the lower screw conveyer 9 are designed to be driven by the driving force of the load-out motor 25b.

Below one of the end sides (the side indicated by A in FIG. 3) of the humidification/dehydration apparatus 1 in the longitudinal direction a hot-air generation burner 14 using kerosene as a fuel and a humidifying unit 13 are provided. On the other hand, below the other end (the side represented by B in FIG. 3) of the humidification/dehydration apparatus 1 in the longitudinal direction, an air exhausting fan 20 equipped with a fan motor 25a is provided. The hot-air generation burner 14 is connected to a flow-passage switching valve 16. The air exhausting fan 20, which is arranged at the side B of the air exhausting passage 4 of the humidification/dehydration section 7, vacuums hot air within the air exhausting passage 4 and discharges it out of the apparatus. In the proximity of a supply port of the air supply passage 3 for supplying hot air, a temperature/humidity sensor 21 is provided for detecting the temperature and humidity of humidifying air and hot air. At one of the sides of the bucket conveyer 11, a moisture meter 18 is provided for detecting the moisture content of grain.

During a humidification process, the hot air generated by the hot-air generation burner 14 is vacuumed by the air exhausting fan 20 and passes through the flow-passage switching valve 16 and the humidifying unit 13, leading to humidifying air, which passes from an ventilation port 17, front air passage 15, air supply passage 3, grain flow-down tank 5 and air exhausting passage 4 and is discharged from the air exhausting fan 20 out of the apparatus. During a dehydration process, the hot air is sent so as to pass through a bypass air passage 19 by the flow-passage switching valve 16 and passes though the ventilation port 17, front air passage 15, air supply passage 3, grain flow-down tank 5 and air exhausting passage 4 and is discharged from the air exhausting fan 20 out of the apparatus.

Note that an air blast fan may be connected to the hot-air generation burner 14 to feed back the air discharged from the air exhausting fan 20 for circulation.

Immediately upon initiation of a dehydration operation, part of the hot air is allowed to pass through the humidifying unit 13 to increase a relative humidity of the hot air in order to prevent cracking of grains caused by rapid dehydration. The hot air thus humidified and the hot air supplied from the bypass air passage are mixed at a connecting valve 26 to form a hot air having a relative humidity of about 75%, which can be used for dehydration.

Figure 1:
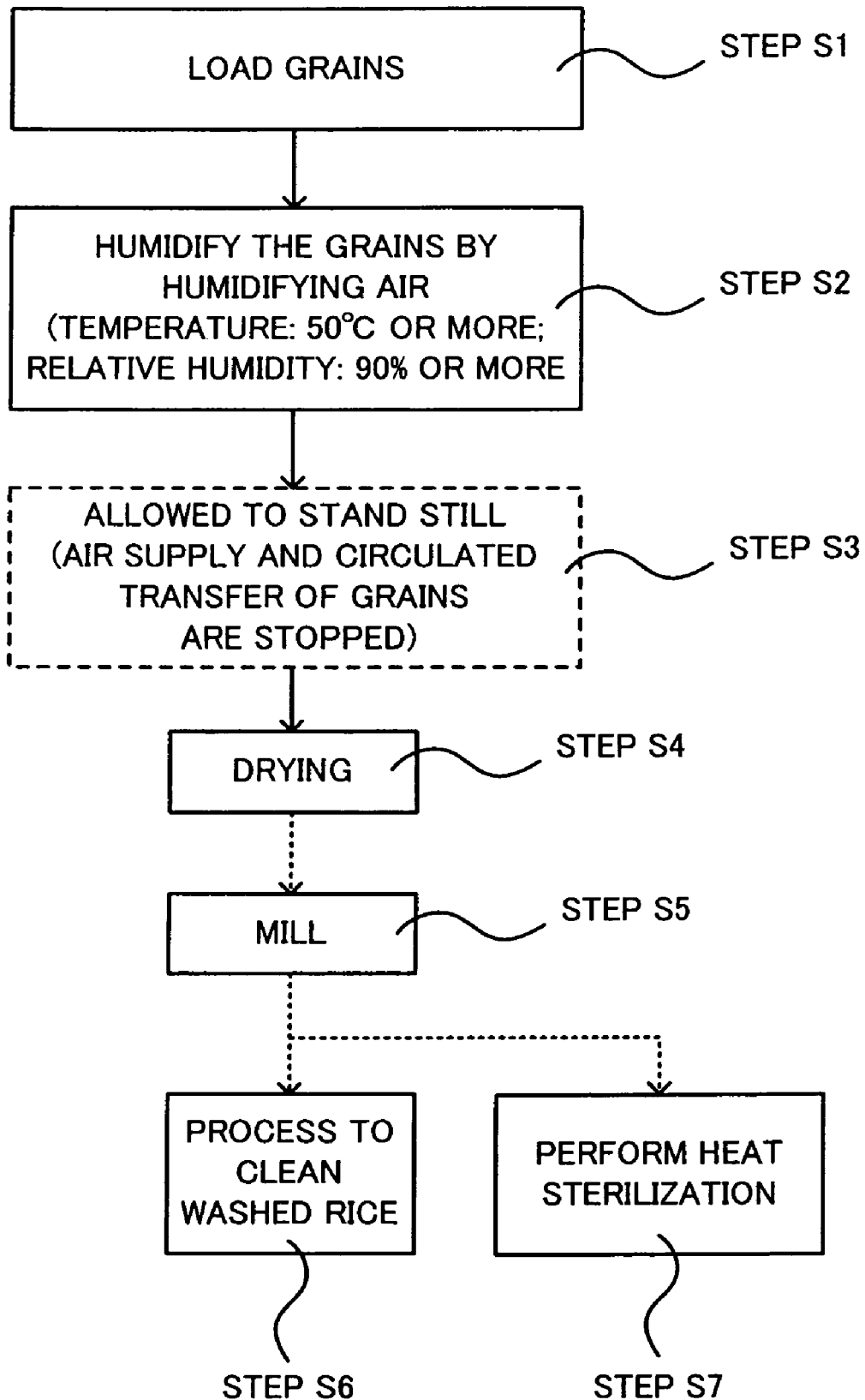
FIG. 1 is a flow chart showing the steps of a method of manufacturing grain having an increased content of a functional component according to the present invention.
Figure 2:
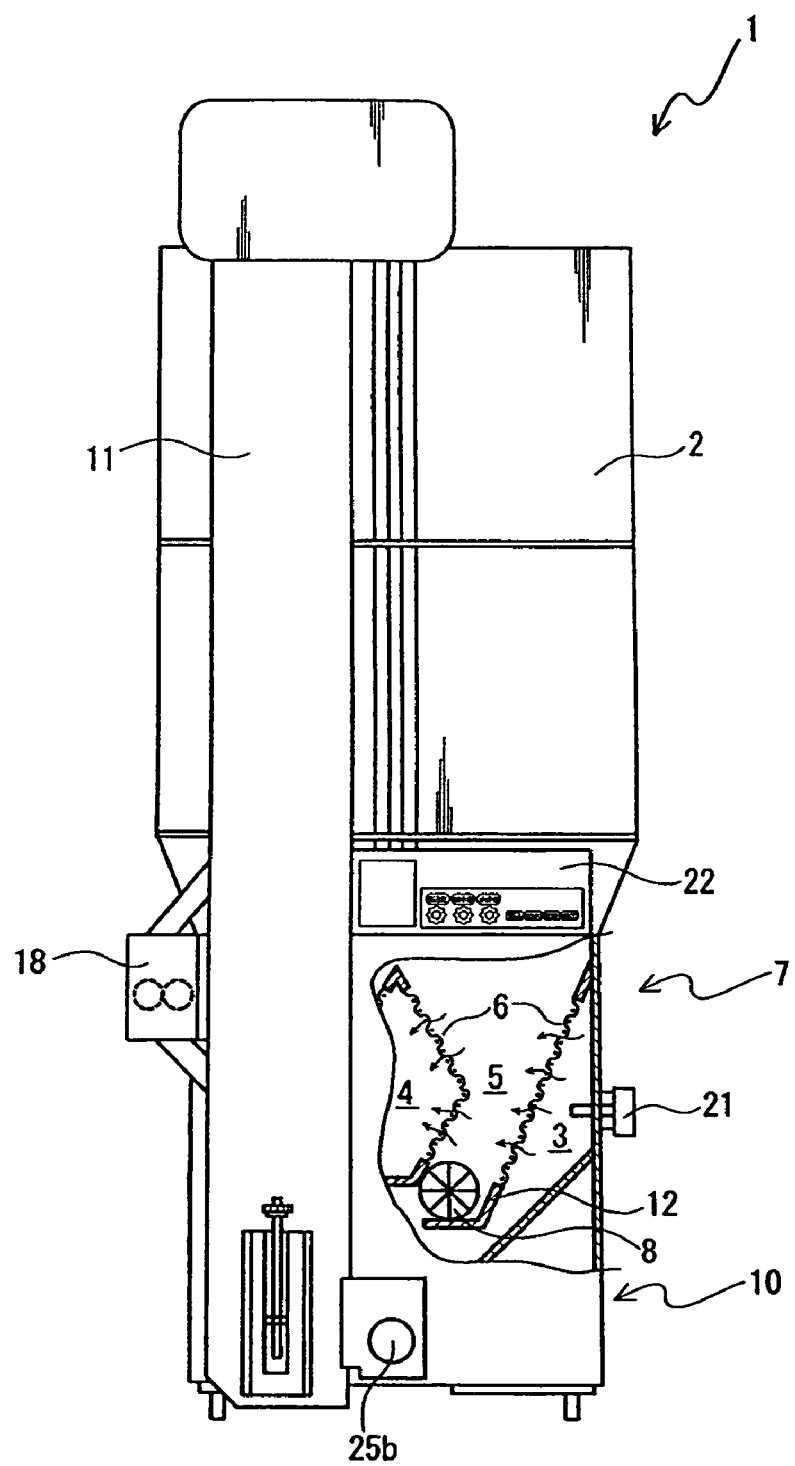
FIG. 2 is a schematic front view (partly broken) of a humidification/dehydration apparatus for carrying out the method of FIG. 1.
Figure 3:
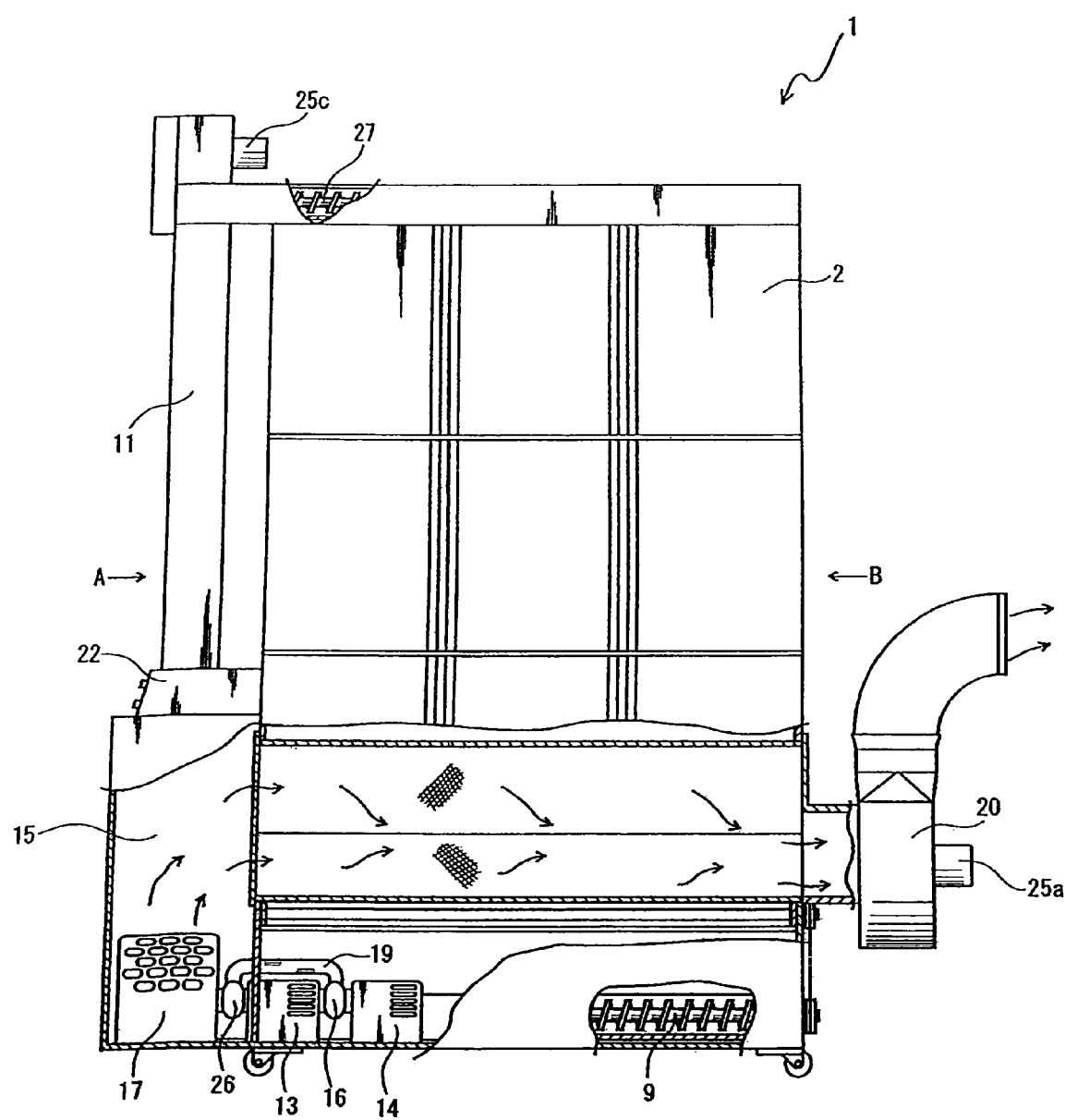
FIG. 3 is a schematic side view (partly broken) of the humidification/dehydration apparatus of FIG. 2.

Next, the structures of the humidifying unit 13 and the hot-air generation burner 14 will be described referring to FIG. 3. The humidifying unit 13 used in this embodiment is a general vaporizing type unit; however, other types of humidifying units including a steam-type humidifying unit may be used. As the hot-air generation burner 14, a burner generally used in a grain dryer may be used.

Note that, the case of using a hot-air generation burner is described in this embodiment; however, a hot air heater, heat exchanger or the like is desirably used in place of the hot-air generation burner. This is because a hot-air generation burner 14 uses kerosene as fuel, raw material grains may take the characteristic odor of fuel oil.

The humidifying unit 13 and the hot-air generation burner 14 are connected via the flow-passage switching valve 16. The flow-passage switching valve 16 can switch the flow channel of hot air generated by the hot-air generation burner 14. In a humidification process, the flow-passage switching valve 16 switches the flow channel such that the whole amount of hot air passes through the humidifying unit 13, whereas, in a dehydration process, it passes through the bypass air passage 19. Note that the structure of the flow-passage switching valve 16 is designed such that part of the hot air is allowed to pass through the humidifying unit 13 in order to control the humidity of the hot air.

Figure 5:
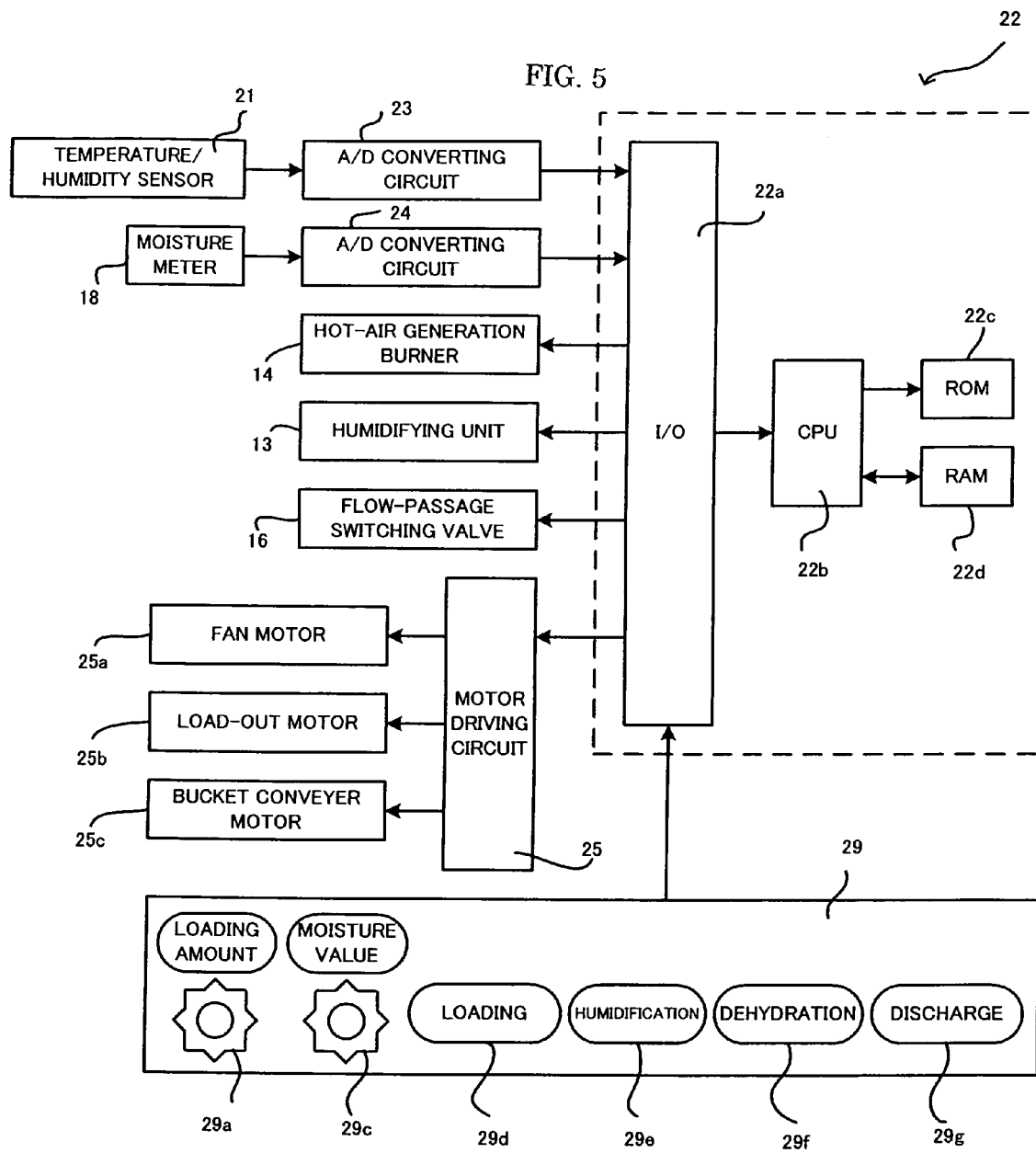
FIG. 5 is a block diagram of a control unit of the humidification/dehydration apparatus of FIG. 2.

Individual sections of the humidification/dehydration apparatus 1 are controlled by a controlling part 22, which is provided at the side A of the humidification/dehydration apparatus 1. As shown in FIG. 5, the controlling part 22 is primarily composed of a CPU 22b. To the CPU 22b, an input/output port 22a, a reading-only memory (hereinafter referred to as a "ROM") 22c and a write/read memory unit (hereinafter referred to as a "RAM) 22d are independently connected. The ROM 22c stores programs for carrying out the humidification operation and the dehydration operation in advance.

To the input/output port 22a, the temperature/humidity sensor 21 is connected by way of an A/D converting circuit 23 and the moisture meter 18 is also connected by way of an A/D converting circuit 24. Furthermore, to the input/output port 22a, the humidifying unit 13, the hot-air generation burner 14, the flow-passage switching valve 16 and an input unit 29 are connected. Other than these, the fan motor 25a, the load-out motor 25b and a bucket conveyer motor 25c are independently connected by way of a motor driving circuit 25.

The input unit 29 has a loading amount setting switch 29a for setting a loading amount, a moisture content setting switch 29c for setting the moisture content of a final product, a loading button 29d for initiating loading, a humidification button 29e for initiating humidification, a dehydration button 29f for initiating dehydration, and a discharge button 29g for initiating discharge of grains. When the user presses a switch or button of the input unit, a control signal is transmitted to the CPU 22b, which executes the humidification operation program or the dehydration operation program.

Next, the operation of the humidification/dehydration apparatus 1 will be described. First, a humidification operation (humidification step) will be described. Raw material grains are loaded into the humidification/dehydration apparatus 1 (Step S1). The loading amount of the grains is set by the loading amount setting switch 29a. After the setting, the user presses the humidification button 29e. Then, CPU 22b executes the humidification operation program installed in the ROM 22c (Step S2). When the humidification operation program is executed, current is supplied separately to the fan motor 25a, load-out motor 25b and bucket conveyer motor 25c to drive the air exhausting fan 20, discharge valve 8, lower screw conveyer 9, bucket conveyer 11 and upper screw conveyer 27, separately.

Furthermore, the humidifying unit 13 and the hot-air generation burner 14 are also driven and initiate generation of humidifying air. The humidity and temperature of humidifying air to be supplied to the grain flow-down tank 5 of the humidification/dehydration section 7 is previously determined based on the loading amount of grains set at the initiation time of humidification operation. In order to control the humidity and temperature of the humidifying air to be the predetermined humidity and temperature, the level of burning of the hot-air generation burner 14 is varied based on the humidity and temperature detected by the temperature/humidity sensor 21.

The volume of the humidifying air passing through the grain flow-down tank 5 during the humidification operation may be controlled within the range of 0.2 to 0.4 cubic meter/second-ton, desirably 0.25 to 0.35 cubic meter/second-ton, and more desirably, 0.28 to 0.32 cubic meter/second-ton.

The temperature of the humidifying air may be set at 50° C. or more, desirably 50° C. to 70° C., and more desirably, 60° C. to 70° C. Even if the temperature of the humidifying air is less than 50° C., the amount of a functional component such as γ-aminobutyric acid contained in grains can be increased. However, when the temperature of the humidifying air is low, the humidification time and stationary time must be longer in order to increase the amount of the functional component. However, it is difficult to increase the functional component when a new crop is processed although a little effect is produced in the case of old crop.

Figure 9:
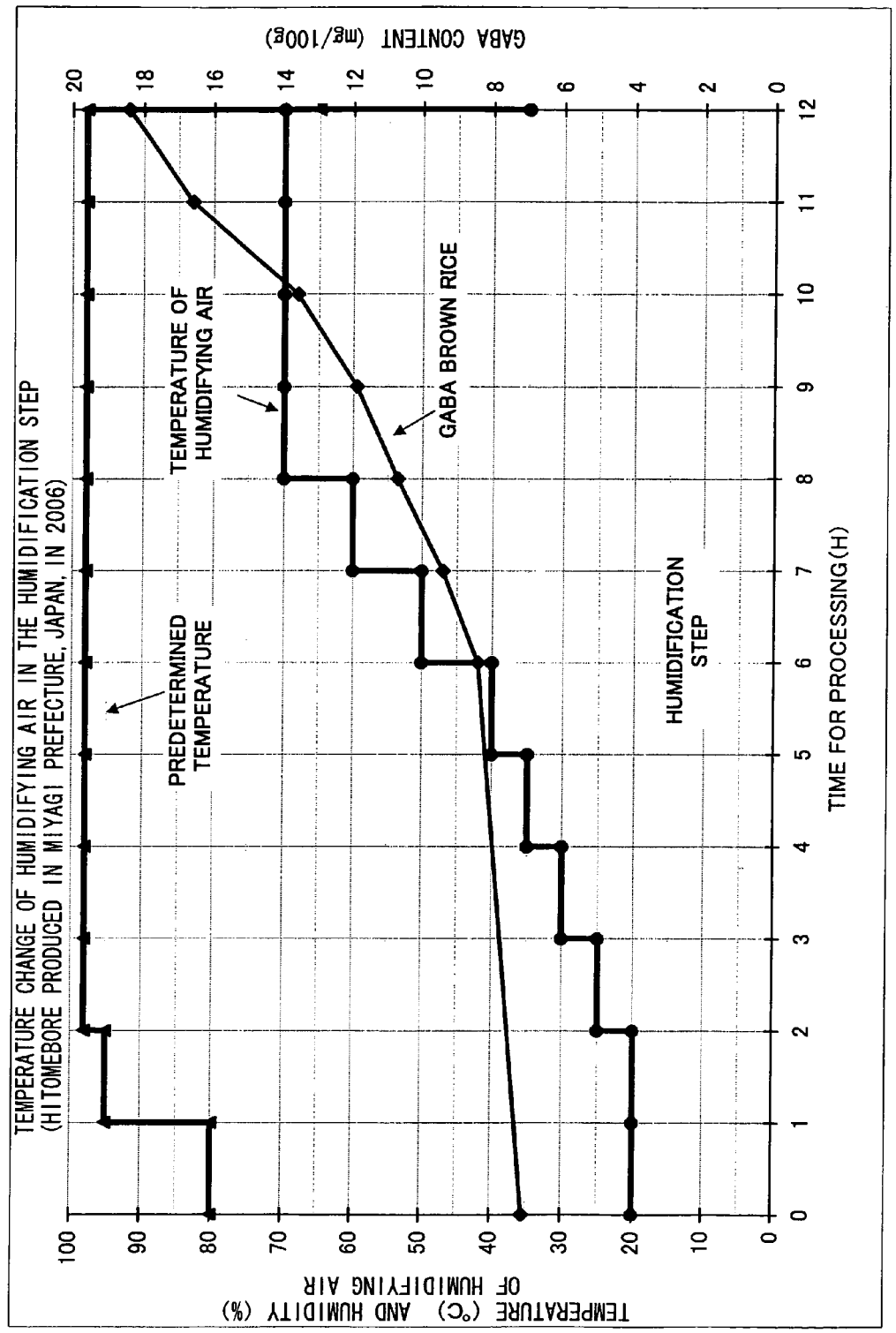
FIG. 9 is a graph showing how to increase temperature of humidifying air in the humidification step.

When grain such as wheat is used as a raw material, since wheat is usually processed into powder by crashing, even if crack such as rice cracking or split is generated in kernels during a humidification process, no problem is raised, because it is finally processed into powder. However, when grain such as rice is used as a raw material, since rice is used in granular form as food, if rice cracking or split is generated during a humidification process, the commercial value decreases. Likewise, when a raw material for a product which is sold in granular form such as rice is humidified, it is desired that the temperature of humidifying air is gradually increased from the initiation of humidification in order to prevent generation of crack such as rice cracking and split in grains. For example, as shown in FIG. 9, the temperature of humidifying air to be supplied to the humidification step is controlled as follows. The temperature is maintained at room temperature (20° C. in FIG. 9) for 2 hours from initiation of the humidification operation, and thereafter, increased at a rate of 5° C. per hour just like 25° C., 30° C., 35° C. and 40° C. Five hours after initiation of the humidification process when the temperature of the humidifying air reaches 40° C., the temperature is increased at a rate of 10° C. per hour until the final temperature of the humidifying air reaches 50° C. or more. Note that the time interval for increasing the temperature of humidifying air in stages and the increment of temperature at each stage when the temperature of the humidifying air is intermittently increased may not be limited to the above examples. It is desirable to set an appropriate time interval for increasing the temperature of humidifying air in stages and an appropriate increment of temperature at each stage, which are experimentally obtained for the materials to be used. Alternatively, the temperature may be increased gradually in a continuous manner, in place of being increased in stages.

The grains, which have flown down from the storage part 2 to the grain flow-down tank 5 of the humidification/dehydration section 7, are humidified by humidifying air, which is generated by the humidifying unit 13 and the hot-air generation burner 14. The grains thus humidified are discharged from the grain flow-down tank 5 by the discharge valve 8, conveyed by the bucket conveyer 11 and the upper screw conveyer 27 and fed back to the storage part 2 for circulation.

When the amount of raw material loaded to the humidification/dehydration section 7 is low, in other words, all amount of raw material can be housed in the grain flow-down tank 5, the feed-back operation of the raw material for circulation may be omitted. This is because even if the raw material is not circulated, humidifying air can be applied to all of the raw material.

The final moisture value of the grain humidified by the humidification step may be appropriately set based on the experimental results and depending upon the type of grain to be processed. The final moisture value may rise within the range of about 16.0% to 18.5%, preferably 16.5% to 18.5%, and more preferably, 17.0% to 18.5%.

After completion of the humidification operation, feedback operation of the grains for circulation and supply of the humidifying air are terminated. Then, a stationary step is initiated in which the humidified grains are allowed to stand still in the humidification/dehydration apparatus 1 (Step S3). In the present invention, the moisture content of the grains during the humidification process is suppressed to 18.5% or less, it is possible to allow the grains to stand still without feed back operation and air supply. The period of time for the stationary step varies depending upon the type of grain to be processed and the amount of γ-aminobutyric acid to be increased; however usually about 4 hours. The time for the stationary step can be easily changed within the range of 0 to 8 hours, desirably 2 to 6 hours, and more desirably, 2 to 4 hours.

The stationary step is useful for treating grain which is required for removing the husk. For example, in the case of grain such as brown rice, which is usually milled or polished into white rice and supplied as food, a functional component such as γ-aminobutyric acid, which is contained larger in the outer surface portion (particularly, germ) of grains of brown rice, is allowed to permeate into the interior of the grains, by providing the stationary step. In this manner, the content of the functional component can be increased when the brown rice is processed into white rice.

Note that when grain which is not required for a process for removing the husk is treated, the stationary step may be omitted.

The stationary step is usually performed after the humidification process. However, when the amount of raw material is low, the stationary step may be performed during the humidification step. In this way, running cost required for transferring the raw material can be saved.

After the stationary step, the dehydration operation is initiated (Step S4). First, a desired dried-product moisture content is set. When the user presses the dehydration button 29*f*, CPU 22*b* executes the dehydration operation program installed in the ROM 22*c*. In this manner, the dehydration operation is initiated. When the dehydration operation program is executed, current is supplied separately to the fan motor 25*a*, load-out motor 25*b* and bucket conveyer motor 25*c* to drive the air exhausting fan 20, discharge valve 8, lower screw conveyer 9, bucket conveyer 11 and upper screw conveyer 27 (which have been in stasis), separately. In addition, the hot-air generation burner 14 starts operating and initiates generation of hot air.

The temperature (predetermined hot-air temperature) of the hot air to be supplied to the grain flow-down tank 5 of the humidification/dehydration section 7 is determined based on the desired dried-product moisture content set at the initiation time of the dehydration operation. Based on the temperature detected by the temperature/humidity sensor 21, the burning level of the hot-air generation burner 14 is controlled until the temperature detected by the temperature/humidity sensor 21 becomes equal to the predetermined hot-air temperature. In the dehydration operation, the predetermined hot-air temperature can be changed depending upon the moisture content of grains, which is measured at any time by the moisture meter 18. In addition, the burning level of the hot-air generation burner 14 can be changed such that the temperature of the hot air to be supplied to the grain flow-down tank 5 becomes equal to the predetermined hot-air temperature thus changed.

The grains, which have flown down from the storage part 2 to the grain flow-down tank 5 of the humidification/dehydration section 7, are dried by ventilation of the hot air generated by the hot-air generation burner 14. The grains dried in the grain flow-down tank 5 in this way are sequentially transferred to the discharge section 10, bucket conveyer 11 and upper screw conveyer 27, and fed back to the storage part 2. The feed-back operation is performed until the moisture content of the grains measured at any time by the moisture meter 18 reaches the desired dried-product moisture content. When the grains are dried until the desired dried-product moisture content is satisfied, the dehydration operation is terminated. In the present invention, since the dehydration step is performed by applying hot air after the humidification operation, bacterial growth in the humidification/dehydration apparatus 1 can be prevented. Operation can be performed hygienically.

A method of processing (milling) grain (hereinafter "Function-enriched grain") having an increased content of a functional component such as γ-aminobutyric acid and manufactured by the manufacturing method of the present invention, will be described.

The Function-enriched grain manufactured by the manufacturing method of the preset invention has the same features as other grains dried by a well-known method except that the content of a functional component such as γ-aminobutyric acid in grains is increased. In addition, no appearance change such as a sign of germination was observed in the grain according to the present invention. Therefore, the grain of the present invention can be treated in the same manner as in general grains.

In the case where the "Function-enriched grain" is a "Function-enriched brown rice", how to mill the Function-enriched brown rice will be described. The brown rice may be milled or polished in a general method into partially milled rice, rice with germ, or white rice depending upon the purpose (Step S5).

Figure 6:
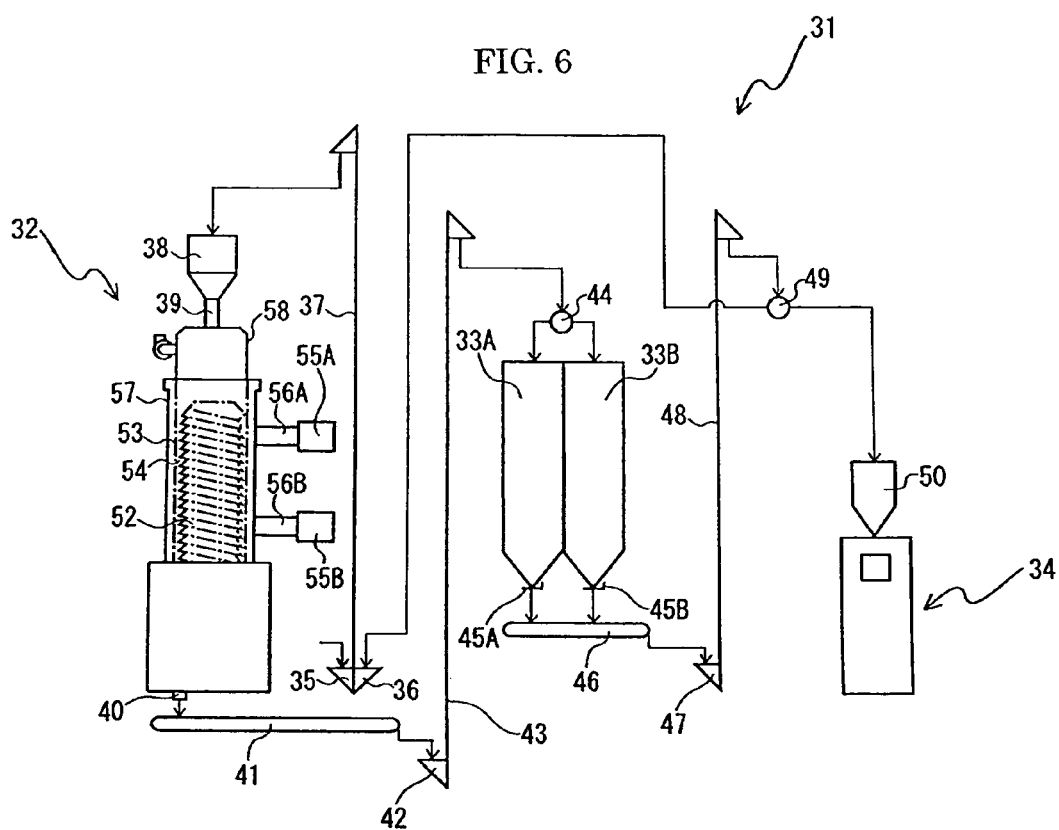
FIG. 6 is a schematic view of an apparatus for milling brown rice into rice with germ.
Figure 7:
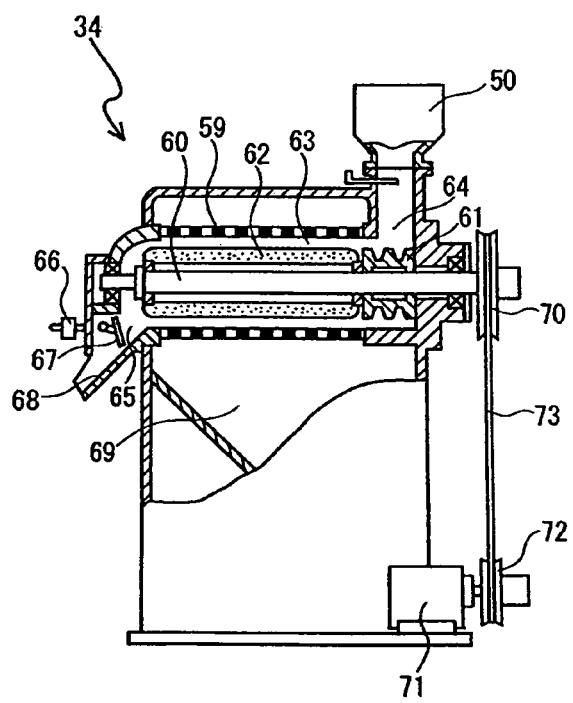
FIG. 7 is a schematic view of a rice-milling machine.
Figure 8:
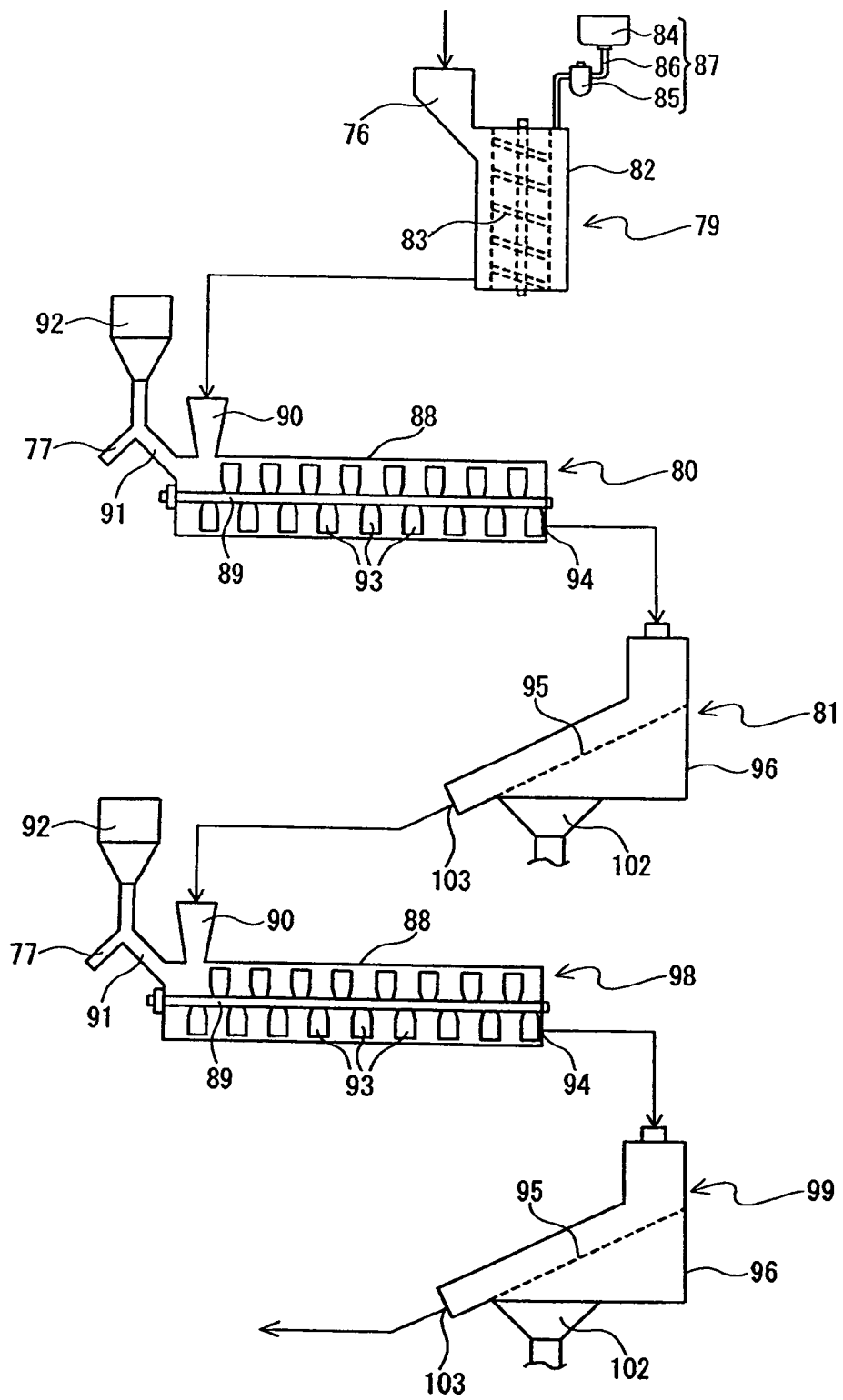
FIG. 8 shows the method for manufacturing clean washed rice.

The Function-enriched brown rice may be milled into rice with germ in accordance with a method as described in Japanese Patent Application Laid-Open No. 6-209724. This method will be explained with reference to FIGS. 6 and 7. FIG. 6 shows the structure of rice-with-germ manufacturing apparatus 31 for milling a Function-enriched brown rice into rice with germ. FIG. 7 shows a longitudinal sectional view (partly broken) of an abrasive type rice milling machine 34.

The rice-with-germ manufacturing apparatus 31 is constituted of a microwave heating device 32 and cooling tanks 33A, 33B, and the abrasive type rice milling machine 34. The grain elevator 37, which has hoppers 35, 36 in the lower portion, communicates with a loading trough 39 of the microwave heating device 32 by way of a loading tank 38. The microwave heating device 32 has a discharge trough 40, which communicates with the cooling tanks 33A, 33B by way of a belt conveyor 41, a hopper 42, a grain elevator 43 and a switching valve 44. The cooling tanks 33A and 33B have discharge shutters 45A and 45B, respectively in the discharge portion. The cooling tanks 33A and 33B communicate with a supply hopper 50 of the abrasive type rice milling machine 34 by way of a belt conveyor 46, a hopper 47, a grain elevator 48 and a switching valve 49.

The microwave heating device 32 has an upright resin cylinder 53 housing a spiral cylinder 52 rotatably provided about a main shaft (not shown). In the space formed between the spiral cylinder 52 and the wall of the cylinder 53, a flow-down passage 54 for brown rice is formed. Oscillators 55A and 55B irradiates microwave through waveguides 56A and 56B, which are connected thereto and arranged such that the tip portions thereof face the side surface of the cylinder 53, to brown rice flowing down through the flow-down passage 54. Furthermore, to the upper end of the machine frame 57 equipped with the waveguides 56A and 56B, a cover cylinder 58 is connected. To the lower portion of the microwave heating device 32, the discharge trough 40 is provided, which is connected to the belt conveyor 41 disposed outside the unit.

As shown in FIG. 7, the abrasive type rice milling machine 34 is composed of a perforated wall grain-milling cylinder 59 arranged horizontally, a main shaft 60 rotatably provided to a machine body, a spiral rotor 61 supported by the main shaft 60, a grain-ribbed rotor 62 and a milling chamber 63. The milling chamber 63 is primarily constituted of the perforated wall grain-milling cylinder 59 and the grain-ribbed rotor 62. One of the ends of the milling chamber 63 communicates with a supply port 64. The other end of the milling chamber 63 communicates with a discharge port 65. The discharge port 65 is provided with a resistance plate 67 urged by a weight 66. The discharge port 65 communicates with the outside of the unit by way of the discharge trough 68. The perforated wall grain-milling cylinder 59 communicates with a dust-collection duct (not shown) by way of a bran-collection chamber 69. A supply hopper 50 is provided above the supply port 64. A belt 73 is looped between a pulley 70 attached to the main shaft 60 and pulley 72 attached to a motor 71.

Next, how to operate the rice-with-germ manufacturing apparatus 31 (including the microwave heating device 32, cooling tanks 33A, 33B and abrasive type rice milling machine 34) will be explained.

The Function-enriched brown rice loaded in the hopper 35 is conveyed by the grain elevator 37 to the loading tank 38, flows down through a loading trough 39 communicating with the loading tank 38 and drops on the top end of the spiral cylinder 52. The Function-enriched brown rice which has fallen onto the top end of the spiral cylinder 52 flows down through the flow-down passage 54 formed in the space between the spiral cylinder 52 and the wall of the cylinder 53 with the help of rotation by spiral cylinder 52. The Function-enriched brown rice flowing down through the flow-down passage 54 is heated by irradiation of microwave generated by the microwave oscillator 55A and passing through the waveguide 56A. The Function-enriched brown rice irradiated with the microwave oscillator 55A flows down through the flow-down passage 54 and again heated by irradiation of microwave generated by the microwave oscillator 55B and passing through the waveguide 56B. The Function-enriched brown rice heated with the microwave oscillator 55B flows down through the flow-down passage 54, passes through the discharge trough 40, and is supplied to the belt conveyer 41.

The Function-enriched brown rice heated by microwave is sequentially conveyed from the belt conveyer 41 to the hopper 42, the grain elevator 43 and the switching valve 44, and loaded into either the cooling tank 33A or 33B by switching operation of the switching valve 44. The Function-enriched brown rice increased in grain temperature by heating with the microwave heating device 32 is cooled by either in the cooling tank 33A or 33B to a temperature equal to or lower than the grain temperature before heating. The Function-enriched brown rice thus cooled is supplied from the cooling tank 33A or 33B to the belt conveyer 46 by opening the shutter 45A or 45B. The Function-enriched brown rice supplied to the belt conveyer 46 is sequentially conveyed to the hopper 47, the grain elevator 48 and the switching valve 49, and then conveyed from the switching valve 49, the hopper 36, the grain elevator 37, loading tank 38 and the loading trough 39 to the microwave heating device 32, where the brown rice is again heated with microwave.

The heating operation in the microwave heating device 32 and the cooling operation in the cooling tank 33A or 33B are repeated a plurality of times to obtain Function-enriched brown rice dried to a moisture content of 13% or less and cooled to a temperature equal to or less than the grain temperature before heating. The Function-enriched brown rice is then supplied by switching operation of the switching valve 49 to the abrasive type rice milling machine 34 by way of the hopper 50.

The Function-enriched brown rice supplied from the supply port 64 of the abrasive type rice milling machine 34 to the spiral rotor 61 is then horizontally transferred to the milling chamber 63 by the spiral rotor 61. The Function-enriched brown rice is milled by the rotation of the grain-ribbed rotor 62 in the milling chamber 63, leading to Function-enriched rice with germ. Dust such as bran generated by the milling operation in the milling chamber 63 is discharged by the vacuum operation of a vacuum (not shown) through holes of the perforated wall grain-milling cylinder 59 to the bran-collection chamber 69, and further sent from the bran-collection chamber 69 to a bran collecting unit such as cyclone separator (not shown). The Function-enriched rice with germ obtained by milling the Function-enriched brown rice reaches the discharge port 65 and flows down through the discharge trough 68 while resisting the resistance plate 67, thereby discharging out of the unit.

The milling operation is not limited to a single time as is in this embodiment. Brown rice may be milled a plurality of times by being circulated by a grain elevator horizontally provided to the side of the abrasive type rice milling machine 34, or by being subjected to a plurality of abrasive type rice milling machines 34 serially arranged. The type of milling machine is not limited to the abrasive type. A general milling machine or polishing machine may be used.

The Function-enriched brown rice manufactured by the manufacturing method of the present invention may be milled into rice with germ by a well known milling machine without heating with microwave while adjusting a yield of the milled rice.

When the brown rice grains are dried, most of water is released out of the grains through the germ. Therefore, the water content is the highest in the junction between the germ and the albumen of the rice grain. Since the energy of microwave is absorbed in water, heat generation is the highest in the junction between the germ and the albumen whose water content is the highest. As a result, the germ and the albumen are gelatinized and bonded to each other. Since the germ and the albumen are gelatinized and bonded, it is difficult to remove the germ even when such brown rice is milled. As a result, in the rice with germ thus obtained, the germ remaining rate is high. Furthermore, since brown rice is cooled in the cooling tank and milled in low temperature conditions, boiled rice thereof is delicious and no deterioration of flavor or taste.

The partially milled rice (hereinafter, referred to as "Function-enriched partially milled rice"), the Function-enriched rice with germ and white rice (hereinafter, referred to as "Function-enriched white rice") obtained by milling the Function-enriched brown rice manufactured by the manufacturing method of the present invention can be treated in the same manner as commercially available partially milled rice, rice with germ and white rice. The Function-enriched partially milled rice can be easily processed into clean washed Function-enriched partially milled rice by a well known technique for obtaining clean washed rice. The Function-enriched rice with germ is also processed into clean washed Function-enriched rice with germ, and the Function-enriched white rice into clean washed Function-enriched white rice (Step S6).

Next, technique for obtaining clean washed rice will be described by taking the Function-enriched white rice as an example.

As the technique for obtaining clean washed rice, a method for manufacturing clean washed rice as described in Japanese Patent Application Laid-Open No. 2001-259447 may be employed. The method for manufacturing clean washed rice will be schematically described referring to FIG. 8, which shows the steps of a method of manufacturing clean washed rice. The steps of manufacturing clean washed rice are mainly performed by use of a water addition means 79, a stirring/mixing means 80 and a separation means 81. Water is added to Function-enriched white rice by the water addition means 79. Pulverized rice is mixed with the Function-enriched white rice to which water is added and which is stirred directly by the stirring/mixing means 80, thereby polishing the Function-enriched white rice. The polished Function-enriched white rice is separated from the used pulverized rice, by the separation means 81.

The water addition means 79 has a white rice guiding cylinder 82 housing a rotatable spiral rotor 83. An appropriate water addition unit 87, which is composed of a water tank 84, an electromagnetic valve 85, and a water pipe 86, etc., is connected to an arbitrary position of the white rice guiding cylinder 82. While the Function-enriched white rice is loaded from the hopper 76, the spiral rotor 83 is rotated in the rice guiding cylinder 82. During the process where rice grains are rotated in this manner, water of 3 to 5% of rice grains by the weight is added by the water addition unit 87. The time of the Function-enriched white rice passing through the white rice guiding cylinder 82 is set at, for example, about 15 seconds. This is because water can be safely added to the Function-enriched white rice while preventing a risk of split generated in rice grains. The surface of the Function-enriched white rice to which water is added becomes slightly soft.

The Function-enriched white rice is immediately loaded into the stirring/mixing means 80 for mixing and stirring with pulverized rice. The stirring/mixing means 80 is primarily composed of a drum-shaped machine frame 88 and a stirring unit 89 rotatably disposed. At one of the ends of the machine frame 88, a white rice supply trough 90 communicating with the water addition means 79 and a pulverized rice supply trough 91 to which pulverized rice is transferred by an appropriate transfer means, are separately connected. When air transfer is employed as the transfer means, a cyclone separator 92 is connected for air separation to the upper end of the pulverized rice supply trough 91. To the cyclone separator 92, a pulverized rice discharge trough 77 is connected as a branch, separately from the pulverized rice supply trough 91. A plurality of stirring blades 93, which are rotated by a power source such as a motor, are attached to the stirring unit 89. When the stirring blades 93 are rotated, the Function-enriched white rice is stirred and mixed with the pulverized rice within the machine frame 88. The grain mixture is discharged from a discharge port 94 provided at the other end of the machine frame 88.

The Function-enriched white rice loaded in the stirring/mixing means 80 is mixed with pulverized rice containing a final moisture content of 5% or less. By virtue of this operation, an aleurone layer formed near the surface of the Function-enriched white rice and swollen by the presence of water is adsorbed by the pulverized rice. The aleurone layer is lift up from an aleurone wall. In addition, the surface of the Function-enriched white rice grains is polished by light abrasion force between the Function-enriched white rice grains and pulverized rice grains. The mixing ratio of the pulverized rice to the Function-enriched white rice is preferably 5 to 30 parts by weight (based on 100 parts by weight of the Function-enriched white rice).

The separation means 81 may have any structure as long as it has a sieving function capable of separating the Function-enriched white rice from pulverized rice like a pre-cleaner 96 having sieve mesh 95. Furthermore, a vibration motor may be provided so as to vibrate the pre-cleaner 96.

As mentioned above, the Function-enriched white rice obtained by the separation means 81 is clean washed rice obtained by removing residual bran from the surface. In order to improve whiteness of the clean washed rice and increase the yield thereof, the Function-enriched white rice obtained by the separation means 81 may be subjected to processing of a second stirring/mixing means 98 and a second separation means 99. By virtue of this processing, the residual bran on the surface of rice grains can be completely removed to manufacture glossy clean washed Function-enriched white rice improved in whiteness.

The Function-enriched partially milled rice and Function-enriched rice with germ can be processed into clean washed rice by use of a technique for obtaining clean washed rice using steam as described in Japanese Patent Application Laid-Open No. 2002-166485. Needless to say, this technique for obtaining clean washed rice can be applied to the Function-enriched white rice.

Furthermore, if superheated stream is used in place of the stream, heat-sterilization of rice grains can be performed at higher temperature (Step S7).

EXAMPLE 1

As an example of the present invention, "Akitakomachi" (brand name of rice, produced in Akita prefecture, Japan, in 2006) was processed by the manufacturing method of the present invention. Using the humidification/dehydration apparatus 1, brown rice of "Akitakomachi" was humidified at a humidification rate of 0.3%/hour or less (a moisture increasing rate of 0.3% or less per hour) such that the moisture content thereof might not exceed 18.5%. In the humidification operation, the relative humidity of the humidifying air was set at 90% or more. The temperature of the humidifying air was maintained at room temperature for one hour from initiation of humidification operation, then increased to 20° C. for the following one hour, and thereafter increased at a rate of 5° C. per hour like 25° C., 30° C., 35° C. and 40° C. In this way, the temperature of the humidifying air reached 40° C. 5 hours after initiation of the humidification operation. Thereafter, the temperature was raised at a rate of 10° C. per hour. Finally, the humidifying air of 70° C. was applied for 4 hours for humidification. After completion of the humidification operation, "Akitakomachi" brown rice was allowed to stand still in the storage part 2 of the humidification/dehydration apparatus 1 for at most 6 hours. In this manner, the amount of γ-aminobutyric acid contained in "Akitakomachi" brown rice was increased. After the stationary operation, the brown rice was subjected to a dehydration operation to obtain a Function-enriched "Akitakomachi" brown rice. Furthermore, the Function-enriched "Akitakomachi" brown rice was milled by a general method to obtain Function-enriched white rice in a yield of 90%.

To compare the content of γ-aminobutyric acid depending upon the stationary operation time, Function-enriched brown rice and Function-enriched white rice were manufactured by setting the stationary time at 0, 2, 4 and 6 hours.

The amounts of γ-aminobutyric acid contained in the "Akitakomachi" Function-enriched brown rice and "Akitakomachi" Function-enriched white rice obtained in this way are shown in Tables 1 and 2, respectively. The amount of γ-aminobutyric acid was measured by high-speed performance liquid chromatograph (LC-VP manufactured by Shimadzu Corporation, Japan).

TABLE 1

Akitakomachi (produced in Akita, Japan, in 2006)

|  | Stationary time (h) | Content of γ-aminobutyric acid (mg/100 g) |
| --- | --- | --- |
| Raw material brown rice | — | 1.5 |
| Function-enriched brown rice | 0 | 17.5 |
| Function-enriched brown rice | 2.0 | 17.6 |
| Function-enriched brown rice | 4.0 | 17.5 |
| Function-enriched brown rice | 6.0 | 17.8 |

TABLE 2

Akitakomachi (produced in Akita, Japan, in 2006)

|  | Stationary time (h) | Content of γ-aminobutyric acid (mg/100 g) |
| --- | --- | --- |
| Raw material white rice | — | 0.9 |
| Function-enriched white rice | 0 | 14.2 |
| Function-enriched white rice | 2.0 | 15.3 |
| Function-enriched white rice | 4.0 | 16.0 |
| Function-enriched white rice | 6.0 | 16.5 |

In Table 1, to show an increase rate of γ-aminobutyric acid in Function-enriched brown rice, the "Akitakomachi" brown rice used as a raw material is indicated by "raw material brown rice". No difference in the content of γ-aminobutyric acid is observed depending upon the presence or absence of the stationary step or the length of the stationary time. When the raw material brown rice is compared to the Function-enriched brown rice, the content of γ-aminobutyric acid of the Function-enriched brown rice is higher by about 11.6 times or more than that of the raw material brown rice.

In Table 2, to show an increase rate of γ-aminobutyric acid in Function-enriched white rice, the "Akitakomachi" white rice used as a raw material is indicated by "raw material white rice". The content of γ-aminobutyric acid varies depending upon the presence or absence of the stationary step or the length of stationary time. The longer the stationary time, the larger the content of γ-aminobutyric acid, as shown in Table 2. When the raw material white rice is compared to the Function-enriched white rice, the content of γ-aminobutyric acid of the Function-enriched white rice is higher by about 15.7 times or more than that of the raw material white rice.

EXAMPLE 2

As an example of the present invention, foxtail millet with husk was processed by the manufacturing method of the present invention. Foxtail millet was humidified by the humidification/dehydration apparatus 1 such that the moisture content thereof might not exceed 18.5%. In the humidification operation, the humidifying air having a relative humidity of 90% or more and a temperature of 60° C. was applied for 4 hours for humidification. In this processing for foxtail millet, after completion of the humidification operation, the stationary step was not performed and directly subjected to the dehydration operation. In the dehydration operation, dry air having a relative humidity of 30% and a temperature of 45° C. was applied for 3 hours from initiation of the dehydration operation. Thereafter, the temperature of the dry air was gradually decreased finally to room temperature. In this way, foxtail millet was dried until the moisture content thereof became about 13% to obtain foxtail millet having an increased content of γ-aminobutyric acid (hereinafter referred to as "Function-enriched foxtail millet").

The amount of γ-aminobutyric acid contained in the Function-enriched foxtail millet thus obtained is shown in Table 3. Note that the amount of γ-aminobutyric acid was measured by high-speed performance liquid chromatograph (LC-VP manufactured by Shimadzu Corporation, Japan).

TABLE 3

|  | Content of γ-aminobutyric acid (mg/100 g) |
|---|---|
| Raw material foxtail millet | 4.8 |
| Function-enriched foxtail millet | 24.1 |

In Table 3, to show an increase rate of γ-aminobutyric acid in Function-enriched foxtail millet, the foxtail millet (fox millet before subjecting to the manufacturing method of the present invention) used as a raw material is indicated by "raw material foxtail millet". When the raw material foxtail millet is compared to the functional-component foxtail millet, the content of γ-aminobutyric acid of the Function-enriched foxtail millet is higher by about 5 times or more than that of the raw material foxtail millet.

EXAMPLE 3

As an example of the present invention, millet with husk was processed by the manufacturing method of the present invention. Millet was humidified by the humidification/dehydration apparatus 1 such that the moisture content thereof might not exceed 18.5%. In the humidification operation, the humidifying air having a relative humidity of 90% or more and a temperature of 60° C. was applied for 4 hours for humidification. In this processing for millet, after completion of the humidification operation, millet was not subjected to the stationary operation and directly subjected to the dehydration operation. In the dehydration operation, dry air having a relative humidity of 30% and a temperature of 45° C. was applied for 3 hours from initiation of the dehydration process. Thereafter, the temperature of the dry air was gradually decreased finally to room temperature. In this way, millet was dried until the moisture content thereof became about 13% to obtain millet having an increased content of γ-aminobutyric acid (hereinafter referred to as "Function-enriched millet").

The amount of γ-aminobutyric acid contained in the Function-enriched millet is shown in Table 4. Note that the amount of γ-aminobutyric acid was measured by high-speed performance liquid chromatograph (LC-VP manufactured by Shimadzu Corporation, Japan).

TABLE 4

|  | Content of γ-aminobutyric acid (mg/100 g) |
|---|---|
| Raw material millet | 9.6 |
| Function-enriched millet | 31.6 |

In Table 4, to show an increase rate of γ-aminobutyric acid in Function-enriched millet, the millet (before processing by the method of the present invention) used as a raw material is indicated by "raw material millet". When the raw material millet is compared to the Function-enriched millet, the content of γ-aminobutyric acid of the Function-enriched millet is higher by about 3.3 times than that of the raw material millet.

EXAMPLE 4

As an example of the present invention, buckwheat with husk was processed by the manufacturing method of the present invention. Buckwheat was humidified by the humidification/dehydration apparatus 1 such that the moisture content thereof might not exceed 18.5%. In the humidification operation, the humidifying air having a relative humidity of 90% or more and a temperature of 70° C. was applied for 3 hours for humidification. In this processing for buckwheat, after completion of the humidification operation, buckwheat was not subjected to the stationary operation and directly subjected to the dehydration operation. In the dehydration operation, dry air having a relative humidity of 30% and a temperature of 35° C. was applied for 6 hours from initiation of the dehydration operation. Thereafter, the temperature of the dry air was gradually decreased finally to room temperature. In this way, buckwheat was dried until the moisture content thereof became about 15% to obtain buckwheat having an increased content of γ-aminobutyric acid (hereinafter referred to as "Function-enriched buckwheat").

The amount of γ-aminobutyric acid contained in the Function-enriched buckwheat is shown in Table 5. Note that the amount of γ-aminobutyric acid was measured by high-speed performance liquid chromatograph (LC-VP manufactured by Shimadzu Corporation, Japan).

TABLE 5

|  | Content of γ-aminobutyric acid (mg/100 g) |
|---|---|
| Raw material buckwheat | 3.4 |
| Function-enriched buckwheat | 39.6 |

In Table 5, to show an increase rate of γ-aminobutyric acid in Function-enriched buckwheat, the buckwheat (before processing by the method of the present invention) used as a raw material is indicated by "raw material buckwheat". When the raw material buckwheat is compared to the Function-enriched buckwheat, the content of γ-aminobutyric acid of the Function-enriched buckwheat is higher by about 11.6 times or more than that of the raw material buckwheat.

EXAMPLE 5

As an example of the present invention, wheat was processed by the manufacturing method of the present invention. Wheat was humidified by the humidification/dehydration apparatus 1 such that the moisture content thereof might not exceed 18.5%. In the humidification operation, the humidifying air having a relative humidity of 90% or more and a temperature of 70° C. was applied for 4 hours for humidification. In this processing for wheat, after completion of the humidification operation, wheat was not subjected to the stationary operation and directly subjected to the dehydration operation. In the dehydration operation, dry air having a relative humidity of 30% and a temperature of 35° C. was applied for 6 hours from initiation of the dehydration operation. Thereafter, the temperature of the dry air was gradually decreased finally to room temperature. In this way, wheat was dried until the moisture content thereof became about 14% to obtain wheat having an increased content of γ-aminobutyric acid (hereinafter referred to as "Function-enriched wheat").

The amount of γ-aminobutyric acid contained in the Function-enriched wheat is shown in Table 6. Note that the amount of γ-aminobutyric acid was measured by high-speed performance liquid chromatograph (LC-VP manufactured by Shimadzu Corporation, Japan).

TABLE 6

|  | Content of γ-aminobutyric acid (mg/100 g) |
|---|---|
| Raw material wheat | 1.6 |
| Function-enriched wheat | 18.0 |

In Table 6, to show the increase rate of γ-aminobutyric acid in Function-enriched wheat, the wheat (before processing by the method of the present invention) used as a raw material is indicated by "raw material wheat". When the raw material wheat is compared to the Function-enriched wheat, the content of γ-aminobutyric acid of the Function-enriched wheat is higher by 11.25 times than that of the raw material wheat.

Figure 10:
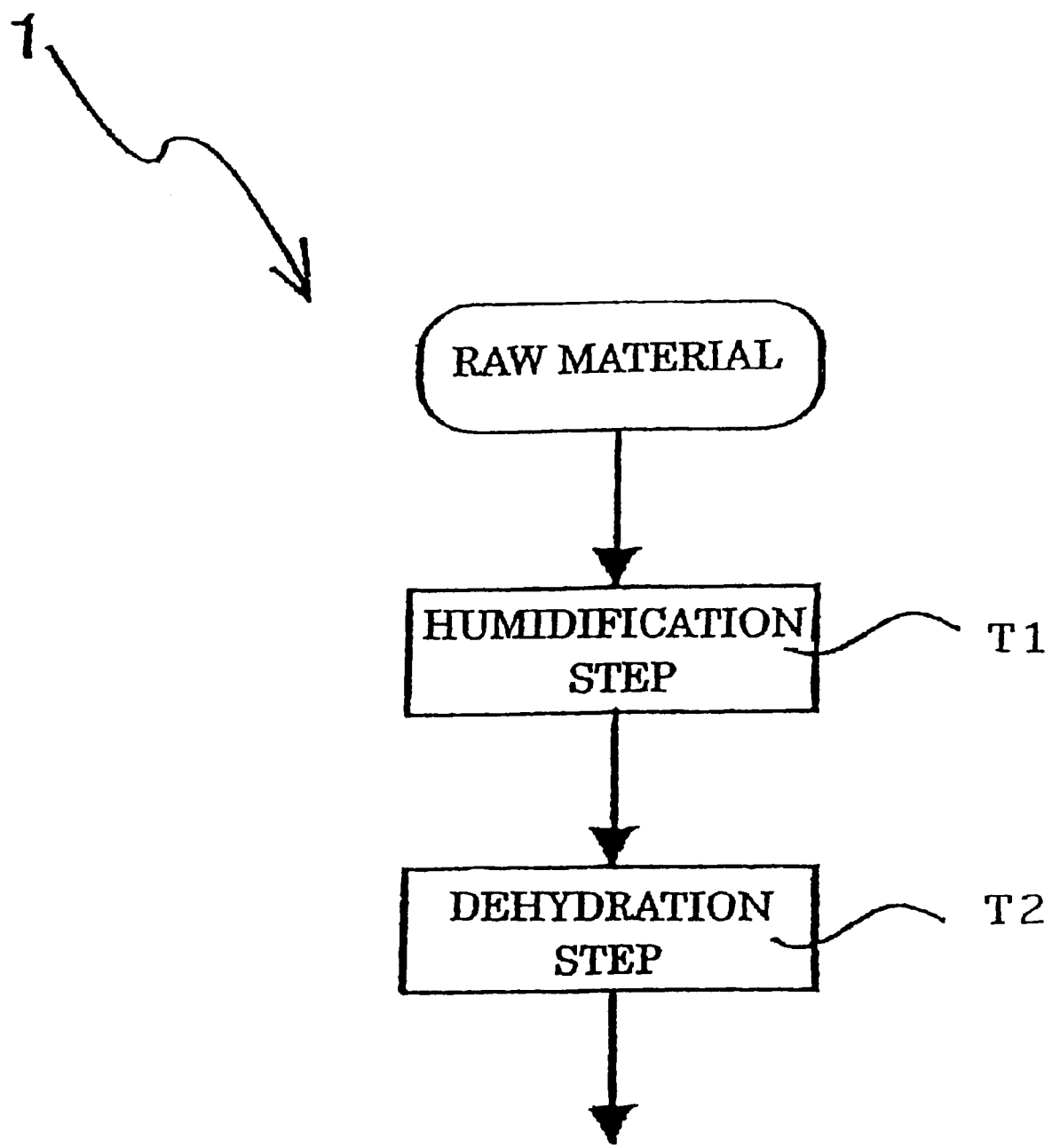
FIG. 10 is a flowchart showing the steps of a method of manufacturing legume having an increased content of a functional component.

Next, a method of manufacturing legume having an increased content of a functional component will be described referring to FIG. 10. This method is constituted of a humidification step and a dehydration step.

First, the humidification step (Step T1) will be described. In the humidification step, a raw material must be exposed to highly humidified air. For this, a raw material is loaded into a unit such as a homothermal-humidistat vessel in which the inner temperature and humidity can be controlled. In this example, a homothermal-humidistat vessel which is put into general use is employed. Furthermore, the humidification step and dehydration step may be performed while conveying a raw material by a belt conveyer (including multi-stage conveyer) in the ambient conditions where ambient temperature and humidity can be controlled.

The temperature of the homothermal-humidistat vessel for humidifying a raw material is set at 50° C. to 70° C., desirably 55° C. to 70° C. and more desirably, 61° C. to 70° C. The temperature may be less than 50° C.; however, the increase amount of GABA contained in a raw material decreases. Furthermore, the humidity is controlled such that it is maintained at 90% or more, and desirably, 95% or more. A raw material is loaded into a homothermal-humidistat vessel set at these conditions and allowed to stand still for 2 to 6 hours, and desirably, 3 to 5 hours. At this time, it is not necessary to stir the raw material in the homothermal-humidistat vessel.

Note that the inventors of the present application found that it is suitable to use humidifying air of a temperature higher than 60° C. in order to increase the amount of GABA contained in legume by humidifying it by the humidifying air.

The stationary time for a raw material in the homothermal-humidistat vessel may be appropriately varied depending upon the amount of GABA contained in the raw material. The longer the stationary time, the larger the amount of GABA to be increased. The stationary time is experimentally obtained depending upon the type of raw material. The amount of GABA contained in legume such as mung bean having a relatively smaller diameter can be sufficiently increased in a short time.

The raw material, which is allowed to stand still in the humidification step for a predetermined time, is dried in the dehydration step until the moisture content thereof returns to the content before the humidification step. Dehydration can be performed in a homothermal-humidistat vessel. In the dehydration step (Step T2), the inner temperature of the homothermal-humidistat vessel is reduced to 40° C. and the humidity thereof is reduced to 70%. In these conditions, primary dehydration of the raw material is performed for 4 to 8 hours.

After the primary dehydration, the temperature of the homothermal-humidistat vessel is reduced to 30° C., and then, secondary dehydration is initiated. Note that the humidity is maintained at the same (70%) value as in the primary dehydration. When the humidity is reduced lower than this value, the surface of the raw material is at a high risk of getting wrinkled. The secondary dehydration may be performed for about 4 hours to 8 hours. In legume such as mung bean having a relatively small diameter, the periods of time of the primary dehydration and secondary dehydration may be reduced. However, legume such as mottled kidney beans having a relatively large diameter is desirably dried in a sufficiently long period of time such that the surface does not get wrinkled.

In an example of the present invention, the dehydration step is divided into two stages: primary dehydration (40° C.) and secondary dehydration (30° C.). However, since it is important to dry a raw material such that the surface of the raw material does not get wrinkled during the dehydration operation, the dehydration stages may not be limited to two and may be three or more. Alternatively, the temperature of the homothermal-humidistat vessel may be reduced gradually and continuously.

In the examples of the present invention, the temperature of the primary dehydration is set at 40° C. and that of the secondary dehydration at 30° C., however, the temperature of the dehydration step may be appropriately changed.

After completion of the secondary dehydration, the raw material is loaded out of the homothermal-humidistat vessel. At this time, the moisture content of the raw material has returned to an original state before the humidification step is performed. In other words, the raw material is the same as that before processing except that the content of GABA is increased. Therefore, the raw material obtained after the dehydration step can be treated in the same manner as in a commercially available general legume.

EXAMPLE 6

In Example 6, as an example of the present invention, the case where black soybeans (produced in the People's Republic of China in 2006) were used as a raw material legume will be described. First, black soybeans (200 grams) were loaded in a homothermal-humidistat vessel (type: FX234P, manufactured by Kusumoto Chemicals Ltd.) controlled so as to have an inner temperature of 70° C. and a relative humidity of 90% or more and they are humidified for 4 hours. Since the temperature of the homothermal-humidistat vessel is increased to a high temperature of 70° C. during humidification, bacterial growth can be prevented, thereby allowing operation to be performed hygienically.

After the humidification, the temperature of the homothermal-humidistat vessel was reduced to 40° C. and the humidity was reduced to 70%. Then, primary dehydration was performed for 4 hours. After completion of the primary dehydration, the temperature of the homothermal-humidistat vessel was reduced to 30° C. (humidity was maintained at 70%), and then secondary dehydration was performed for 8 hours.

The amount of GABA contained in the black soybeans thus processed is shown in Table 7. Note that the amount of GABA was measured by high-speed performance liquid chromatograph (LC-VP manufactured by Shimadzu Corporation, Japan).

TABLE 7

| Name of sample | Content of γ-aminobutyric acid (GABA) (mg/100 g, d.b.) |
|---|---|
| Black soybean (before processing) | 7.4 |
| Black soybean (after processing) | 45.1 |

As shown in Table 7, it can be confirmed that the amount of GABA contained in black soybeans increases by not less than 6 times larger than that before processing by processing the black soybeans by the manufacturing method of the present invention.

EXAMPLE 7

In Example 7, the case where adzuki beans (produced in the People's Republic of China in 2006) were used as a raw material legume will be described. The same homothermal-humidistat vessel as used in Example 6 was used in Example 7. First, adzuki beans (200 grams) were loaded in the homothermal-humidistat vessel controlled so as to have an inner temperature of 70° C. and a relative humidity of 90% or more, and they were humidified for 4 hours. After the humidification, the temperature of the homothermal-humidistat vessel was reduced to 40° C. and the humidity was reduced to 70%. Then, primary dehydration was performed for 4 hours. After completion of the primary dehydration, the temperature of the homothermal-humidistat vessel was reduced to 30° C. (humidity was maintained at 70%), and then secondary dehydration was performed for 6 hours.

The amount of GABA contained in the adzuki beans thus processed is shown in Table 8. Note that the amount of GABA was measured by high-speed performance liquid chromatograph (LC-VP manufactured by Shimadzu Corporation, Japan) in the same manner as in Example 6.

TABLE 8

| Name of sample | Content of γ-aminobutyric acid (GABA) (mg/100 g, d.b.) |
|---|---|
| Adzuki bean (before processing) | 0.9 |
| Adzuki bean (after processing) | 19.5 |

As shown in Table 8, it can be confirmed that the amount of GABA contained in adzuki beans increases by not less than 21 times larger than that before processing, by processing the adzuki beans by the manufacturing method of the present invention.

EXAMPLE 8

In Example 8, the case where mung beans (produced in the People's Republic of China in 2006) were used as raw material legume will be described. The same homothermal-humidistat vessel as used in Example 6 was used in Example 8. First, mung beans (200 grams) were loaded in the homothermal-humidistat vessel controlled so as to have an inner temperature of 70° C. and a relative humidity of 90% or more, and they are humidified for 4 hours. After the humidification, the temperature of the homothermal-humidistat vessel was reduced to 40° C. and the humidity was reduced to 70%. Then, primary dehydration was performed for 4 hours. After completion of the primary dehydration, the temperature of the homothermal-humidistat vessel was reduced to 30° C. (humidity was maintained at 70%), and then, secondary dehydration was performed for 4 hours.

The amount of GABA contained in the mung beans thus processed is shown in Table 9. Note that the amount of GABA was measured by high-speed performance liquid chromatograph (LC-VP manufactured by Shimadzu Corporation, Japan) in the same manner as in Example 6.

TABLE 9

| Name of sample | Content of γ-aminobutyric acid (GABA) (mg/100 g, d.b.) |
|---|---|
| Mung bean (before processing) | 1.7 |
| Mung bean (after processing) | 88.1 |

As shown in Table 9, it can be confirmed that the amount of GABA contained in mung beans increases by not less than 51 times larger than that before processing, by processing the mung beans by the manufacturing method of the present invention.

EXAMPLE 9

In Example 9, the case where mottled kidney beans (produced in the People's Republic of China in 2006) were used as raw material legume will be described. The same homothermal-humidistat vessel as used in Example 6 was used in Example 9. First, mottled kidney beans (200 grams) were loaded in the homothermal-humidistat vessel controlled so as to have an inner temperature of 70° C. and a relative humidity of 90% or more, and they were humidified for 4 hours. After the humidification, the temperature of the homothermal-humidistat vessel was reduced to 40° C. and the humidity was reduced to 70%. Then, primary dehydration was performed for 8 hours. After completion of the primary dehydration, the temperature of the homothermal-humidistat vessel was reduced to 30° C. (humidity was maintained at 70%), and then, secondary dehydration was performed for 8 hours.

The amount of GABA contained in the mottled kidney beans thus processed is shown in Table 10. Note that the amount of GABA was measured by high-speed performance liquid chromatograph (LC-VP manufactured by Shimadzu Corporation, Japan) in the same manner as in Example 6.

TABLE 10

| Name of sample | Content of γ-aminobutyric acid (GABA) (mg/100 g, d.b.) |
|---|---|
| Mottled kidney bean (before processing) | 3.4 |
| Mottled kidney bean (after processing) | 64.1 |

As shown in Table 10, it can be confirmed that the amount of GABA contained in mottled kidney beans increases by not less than 18 times larger than that before processing, by processing the mottled kidney beans by the manufacturing method of the present invention.

What is claimed is:

1. A method of manufacturing grain having an increased content of γ-aminobutryic acid comprising:

a humidification step humidifying grains of a raw material by applying to the grains humidifying air having a temperature of 50° C. or more and a relative humidity of 90% or more, at a humidification rate of 0.3% /hour or less such that the moisture content of the grains rises within the range of 16.0% to 18.5% with the temperature of the humidifying air being increased in stages as time advances;

a stationary step of allowing the humidified grains to stand still for 2 to 6 hours with the applying of humidifying air to the grains stopped, thereby allowing γ-aminobutryic acid contained in the outer surface portion of the grains to permeate into the interior of the grains; and a dehydration step of drying the grains by applying heated air to the grains after the stationary step, wherein immediately after the start of the dehydration step the relative humidity of the heated air applied to the grains is increased by mixing the heated air with humidified air.

* * * * *

UNITED STATES PATENT AND TRADEMARK OFFICE
CERTIFICATE OF CORRECTION

PATENT NO.         : 8,399,037 B2
APPLICATION NO.    : 12/153375
DATED              : March 19, 2013
INVENTOR(S)        : Takeshi Fukumori et al.

It is certified that error appears in the above-identified patent and that said Letters Patent is hereby corrected as shown below:

In the Claims

Column 21, Line 3, In Claim 1, delete "γ-aminobutryic" and insert -- γ-aminobutyric --, therefor.
Column 22, Line 3, In Claim 1, delete "γ-aminobutryic" and insert -- γ-aminobutyric --, therefor.

Signed and Sealed this
Second Day of July, 2013

Teresa Stanek Rea
*Acting Director of the United States Patent and Trademark Office*